S. R. GRAY.
PORTABLE CAMERA SUPPORT.
APPLICATION FILED JUNE 2, 1921.
1,392,144.
Patented Sept. 27, 1921.
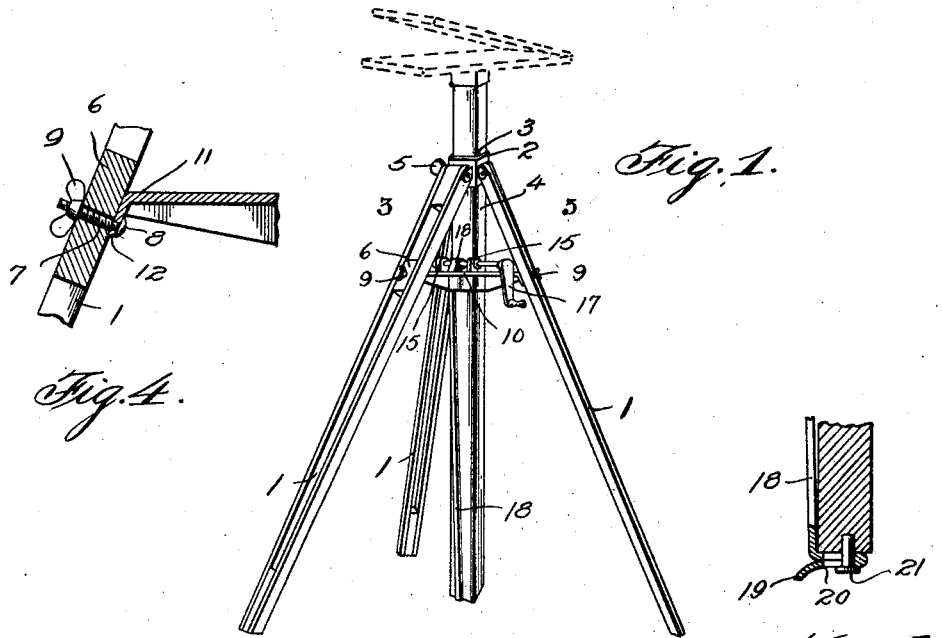
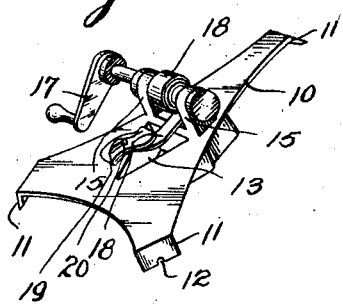
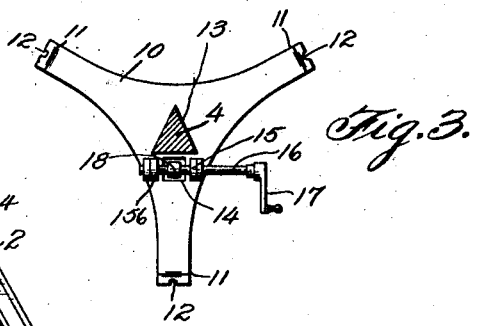
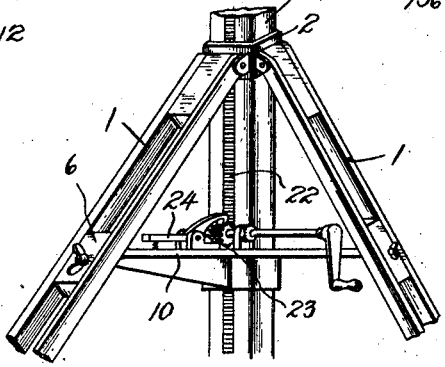
Inventor
Samuel R. Gray
By Frank H. Borden
his Attorney

UNITED STATES PATENT OFFICE.

SAMUEL R. GRAY, OF GERMANTOWN, PENNSYLVANIA.

PORTABLE CAMERA-SUPPORT.

1,392,144.  Specification of Letters Patent.  Patented Sept. 27, 1921.

Application filed June 2, 1921. Serial No. 474,354.

*To all whom it may concern:*

Be it known that I, SAMUEL R. GRAY, a citizen of the United States, residing at Germantown, in the county of Philadelphia and State of Pennsylvania, have invented certain new and useful Improvements in Portable Camera-Supports, of which the following is a specification.

My invention relates to improvements in portable camera supports, pertaining particularly to supports of the tripod type.

In commercial photography it is frequently necessary to use a studio camera away from the studio, as for instance for weddings or other functions in homes. It is just as essential that the camera be rigidly supported as it is in a studio, particularly in view of the weight of the camera, and it is essential that the camera and stand be very quickly assembled and the camera properly focused else the subjects tire and the resulting photographs are not acceptable.

The support or stand for studio use is a heavy and cumbersome affair constructed for vertical adjustments in the proper focusing of the camera, but it is not portable and cannot be used away from the studio because of its bulk and weight. The ordinary tripod will not suffice as it is not susceptible to vertical adjustments without changing the angle of the legs, and there is a constant danger of a collapse of the tripod with consequent injury to the camera, especially on a hardwood floor.

It is the object therefore of my invention to provide a portable camera support which can be easily and quickly assembled, which is rigid and strong when assembled capable of supporting a heavy camera, and, further, which is constructed for quick and accurate vertical adjustments.

In carrying out my invention I provide a casting having a central orifice, to which casting legs are pivotally connected, the legs carrying laterally extending bolts, a removable triangular plate having slotted flanges which engage the bolts and a portion of the legs and form a rigid and inflexible brace for the support, the plate having a central orifice, a camera post slidably mounted in both orifices, and means on the plate for vertical adjustment of the post.

In the accompanying drawings, forming a part of my application,

Figure 1, is a perspective view of the preferred form of my invention assembled and set up for use, Fig. 2, is a perspective view of the triangular bracing plate, Fig. 3, is a top plan view of the plate, Fig. 4, is a detail in section through the leg and plate, partially broken away, Fig. 5, is a vertical section through a portion of the camera post, showing the connection of the strap and post for vertical adjustment, and Fig. 6, is a side elevation of a modified form of my invention.

The legs 1 are pivotally connected to the upper casting or guide block 2, which has a central orifice 3 in which the post 4 is slidably mounted. This block also carries a set screw 5 bearing against the post 4 to hold the post in a desired adjusted position.

The legs which may be of any sort desired, are provided with solid portions or bracing blocks 6, in which bolts 7 are mounted. These bolts have a slight movement relative to the blocks and terminate at one end in a head 8. The other end is threaded to receive a wing nut 9.

The plate 10 made preferably of aluminum or similar material is triangular in shape and is provided with angular flanges 11 slotted as at 12. The plate is provided with a central orifice 13 of a shape to receive the bottom or lower portion of the camera post. As shown in Fig. 3 the plate is also provided with a smaller opening 14 on either side of which journals 15 are located which carry the crank shaft 16. The crank shaft terminates in a crank arm or handle 17 and carries a roll of metal tape 18. This tape is preferably made of chrome nickel and terminates in a loop 19 provided with a keyhole slot 20 adapted to removably engage the headed pin 21 in the bottom of the camera post.

In assembling to the position shown in Fig. 1, the legs are swung out on their pivots, plate 10 is then placed in position by slipping the slots in the flanges over bolts 7, and tightening wing nuts 9, so that the bolt heads 8 engage behind the respective flanges 11, and fasten the legs rigidly to the plate, thus forming a rigid and inflexible stand. Camera post 4 is then inserted longitudinally through the openings in the guide block and plate, the reel of tape is unwound through opening 14, and the loop on the end of the tape is fastened over pin 21.

When thus assembled vertical adjustments of the camera post are made by rotation of the crank arm, winding and unwinding the tape and sliding the post vertically. The post is locked at a desired height by a turn of set screw 5.

In Fig. 6, I have shown a modification of the elevating mechanism, in which a rack 22 on the post is actuated by a pinion 23 on the crank arm, and is locked by a spring pressed pawl 24.

It is thought that the operation and efficiency of the device will be apparent, as will the other uses to which it may be put, as for instance to support a table or a light stand, although it is particularly designed for cameras.

I claim as my invention:

1. In a portable camera support the combination with a guide block, of legs pivotally connected thereto, engaging means on the legs, and a rigid plate adapted for direct removable connection with said engaging means for forming a rigid and inflexible support.

2. In a portable camera support the combination with a guide block, of legs pivotally connected therewith, headed bolts extending laterally from said legs, and a rigid plate having slotted depending flanges adapted for removable connection with said bolts in which the slotted flanges engage the bolts as well as a portion of the legs, and means for tightening the headed bolts upon the flanges for rigidly fastening the plate and the legs together.

3. In a portable camera support the combination with a guide block, of legs pivotally connected therewith, headed bolts extending laterally from said legs, and a rigid plate having slotted depending flanges adapted for removable connection with said bolts in which the slotted flanges engage the bolts and a portion of the legs, means for tightening the bolts upon the flanges for rigidly fastening the plate and the legs together, a post slidably mounted in the guide block, and means for moving said post vertically comprising a rotatable crank shaft, a roll of tape mounted on said shaft and removably connected with a portion of said post.

4. In a portable camera support the combination with a guide block, of legs pivotally connected therewith, headed bolts extending laterally from said legs, a rigid plate having slotted depending flanges adapted for removable connection with said bolts in which the slotted flanges engage the bolts and a portion of the legs, means for tightening the bolts upon the flanges for rigidly fastening the plate and the legs together, a post slidably mounted in the guide block, means for moving said post vertically comprising a rotatable crank shaft, a roll of tape mounted on said shaft and removably connected with a portion of said post, and means for locking said post at any desired position.

In testimony whereof I affix my signature.

SAMUEL R. GRAY.